Figure 1:
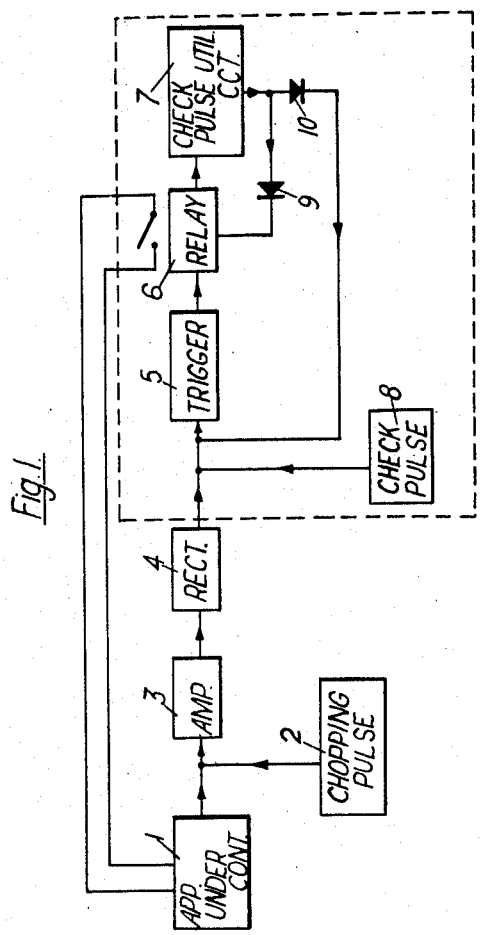

Sept. 22, 1964　　　P. R. DASTIDAR　　　3,150,294
ELECTRIC CONTROL OR MONITORING EQUIPMENT OR APPARATUS
Filed March 29, 1960　　　2 Sheets-Sheet 1

Inventor
Pranab R. Dastidar
By
Browne, Schuyler & Beveridge
Attorney

United States Patent Office 3,150,294
Patented Sept. 22, 1964

3,150,294
ELECTRIC CONTROL OR MONITORING EQUIPMENT OR APPARATUS
Pranab R. Dastidar, Bombay, India, assignor to E. K. Cole Limited, Southend-on-Sea, England
Filed Mar. 29, 1960, Ser. No. 18,298
Claims priority, application Great Britain Apr. 10, 1959
6 Claims. (Cl. 317—148.5)

In atomic reactors various instruments are required to monitor the equipment, to give warning of faults and in the extreme to shut down the reactor. The instruments themselves must be monitored to ensure that they are giving true readings which they may not do if a component failed. For example, from the temperature of the reactor an electric signal is derived whose magnitude must be within predetermined limits and which if exceeded must give the warning or shut down. The term "fail safe" has been applied to the important requisite that should any component fail the effect will not introduce any danger or risk. It is important that the instrumentation should have the "fail-safe" characteristic.

Various functions may have to be performed by such instrumentation. For example, if the temperature of the reactor exceeds a given value a relay may operate to shut down the reactor, or where the reactor is to operate within predetermined temperature limits a device may be provided which as those limits are reached or approached, gives a voltage which may be used either for indication or control purposes, or both. For convenience we shall refer to both such relay and such device simply as a relay.

Though the present invention was designed for use with control circuits for atomic reactors it is to be understood that it is applicable to any apparatus with control circuits which must have the fail-safe characteristic.

A feature of the invention is a relay control circuit for apparatus of the aforesaid type in which the components of the relay circuit are continuously tested by means of narrow pulses which interrupt the normal operation of the circuit for time intervals so short that they do not affect its D.C. performance, but which on any component failure will cause the circuit of the relay to be de-energised, the arrangement being also such that de-energisation of the relay will also occur in the absence of the narrow pulses at a predetermined point in the control circuit.

Another feature of the present invention is a control or monitoring equipment for an apparatus of the type referred to comprising a relay in a control circuit which, when a predetermined signal condition occurs in its input circuit from the apparatus, the relay is maintained in operation and in which a change in such condition is adapted to cause the relay to release, and wherein there is also impressed on the control circuit a signal waveform which does not affect the operation of the relay under its normal operated condition but is adapted to discriminate immediately when the relay is being held operated otherwise than by the said signal condition and in such an event to cause the relay to release.

In the above arrangement the relay may be adapted to disable the apparatus or to give a warning signal whilst in the preferred arrangement a relay will be provided for both these functions, each relay being operated according to the above principles.

The invention will now be explained in connection with the accompanying drawings, FIGURE 1 of which is a block diagram of a system embodying the present invention as a preferred output component thereof; FIGURE 2 is a circuit diagram of the invention in preferred form showing in more detail the devices contained within the broken line rectangle in FIGURE 1.

Figure 2:
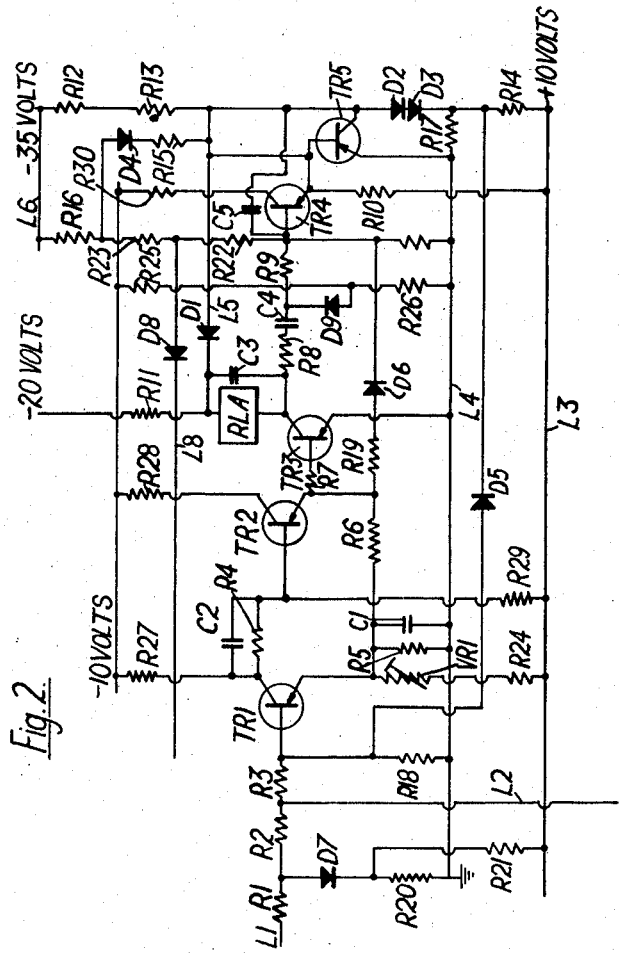

Referring first to FIGURE 1, a system is shown in which from an apparatus 1 under test is derived a D.C. signal which, after chopping by a chopper pulse from a source 2, is amplified in an amplifier 3, the amplified chopped signal being rectified in rectifier 4 and passed to the apparatus within the broken line rectangle X. This apparatus comprises a Schmitt trigger circuit 5, a relay 6 and a check pulse utilisation circuit 7. The check pulse is introduced from a source 8 coupled with the input of the trigger circuit. The apparatus under control by the relay 6 may be an atomic reactor whose operating temperature is to be maintained within safe limits and from which there is derived, say from a thermo-couple, a D.C. voltage which is a function of said temperature. This voltage will usually be too small for D.C. amplification and a chopping pulse from source 2 converts the signal to A.C. which is amplified in amplifier 3 and then rectified in the rectifier 4 to produce an amplified D.C. signal in the lead entering the apparatus X. The trigger circuit 5 has two signal translating components (in this case transistors, as will be explained herebelow) which are interconnected so that when the first is non-conducting or almost non-conducting, the second is conducting hard whereas in the absence of a signal in the said lead, the states of the signal translating components are reversed. In this condition the first component is conducting hard and the second is non-conducting. The state of the trigger circuit governs the operation of the relay 6, so that when the signal is present current from the second component of the trigger circuit causes the relay to be maintained operating. It will be appreciated that faults could arise in the trigger circuit which could cause false operation of the relay, so that the circuit would not be fail-safe. According to the present invention continuous checking pulses are impressed on the input of the trigger circuit and their appearance or non-appearance in the relay circuit is used continuously to check the circuit and components of the trigger circuit. The pulses from the relay circuit are passed to the check-pulse utilisation circuit 7 and absence of the check pulse in this circuit is used to simulate the effect of a failure of signal at the input of the trigger circuit and therefore to cause the relay 6 to de-energise. This is effected by deriving an appropriate voltage from the utilisation circuit 7 and impressing this, through a rectifier 9 on the relay operating circuit. Since the utilisation circuit 7 itself must be fail-safe, means are provided which in the event of a defect in the check pulse utilisation circuit will produce in a rectifier 10 a voltage which will simulate a failure of signal at that point and cause the relay to de-energise.

The above description gives only the broad idea of the invention, the features of which will be more clearly set out herebelow with reference to FIGURE 2 and as will be more precisely delineated in the appended claims.

Referring now to FIGURE 2, a D.C. signal from the apparatus under control is received in the lead L1 and thence through resistors R1, R2 and R3, on the base electrode of a transistor TR1. TR1 is connected to a transistor TR2 in regenerative manner to form the well known Schmitt trigger circuit. The regeneration path is through a resistor R4, TR2, R6, R5 and TR1. The emitter electrode of TR2 is connected through a resistance R7 with the base electrode of a transistor TR3 in whose output circuit is a D.C. relay RLA whose contacts (not shown) operate the load circuit under control. A variable resistor VR1, connected between TR1, a resistor R24 and a +10 volt lead L3, is used to adjust the bias in the regenerative circuit of TR1 and TR2 so that with zero input the relay is deenergised. In this tripped condition of the transistor TR1 is conducting hard, whilst TR2 and TR3 are cut off. Application of a positive voltage in excess of about +0.5 volt at the base of TR1 causes the states of TR1 and TR2 to change regeneratively. TR1 is then virtually non-conducting whilst TR2 conducts and since TR2 drives TR3, the latter also conducts hard, energising the relay RLA. The use of regeneration is to increase the speed of response of the circuit to the signals received, this being common practice. Regeneration will stop only when the loop gain falls below unity.

In D.C. circuits a transistor can be made fail-safe by operating it in Class A (i.e. when working over the linear part of its characteristic curve). Any failure would then produce considerable change in potential at its electrodes which could be used in various ways to de-energise the relay. However in regenerative circuits the transistors have to be driven into non-linearity in the stable states which are heavy conduction or cut off. Failure of transistors by shorting or opening also correspond to these conditions and hence would remain undetected. Furthermore TR3 is also not used in Class A, because the large power through the relay can be controlled in the switching mode by a relatively low dissipation transistor only if operated in the bottomed or cut off conditions. Unless certain measures were taken, as is explained below, it is therefore clear that the circuit so far described is not fail-safe. For example if the circuit were receiving a normal signal and if TR1 open-circuits or if TR2 or TR3 had an internal short circuit, the transistor states would be unchanged and the relay RLA would remain energised. The measures referred to consist in keeping all the components in the circuit continuously tested by means of narrow negative pulses which interrupt the normal operation of the circuit for such short intervals of time that they do not alter its D.C. performance. Such pulses have large space to mark ratio and are fed by the lead L2, from any appropriate source, e.g. a multivibrator (not shown), to the base electrode of TR1. If all components are functioning properly the pulses will reach the output of TR3 but any failure of the components will cause an absence of the pulses at this point. The pulses must be very narrow so that they do not interfere with the normal regeneration at the tripping point. Capacitor C1 is therefore used to bypass the pulses across R5. Resistor R4 helps to prevent TR2 from being driven too far into non-linearity but as it would reduce the D.C. regenerative loop gain, a capacitor C2 is connected across the resistor R4 to compensate this effect. The pulse duration is short enough for the inertia of the relay RLA to prevent chatter. A capacitor C3 also helps to bypass these pulses; besides preventing large induced E.M.F.'s from being set up in the output of TR3 during energising or de-energising of the relay RLA. The collector electrode of TR3 is also connected through a resistor R8 and capacitor C4 to capacitor C5 and resistor R9 which constitute an integrating circuit for the pulse rectified by a diode D9. Diode D9 is connected between the integrating circuit and a common terminal of resistors R25 and R26 inserted across a −10 volt line L7 and common lead L4. This circuit provides an output positive voltage which is impressed on the base electrode of a transistor TR4 whose emitter electrode is connected to the base electrode of a transistor TR5, which also connects through a resistor R10 to the 10 volt positive lead L3.

The relay RLA is energised from a 20 volt supply through a resistor R11, winding of RLA, transistor TR3 and common or earth lead L4. Between the junction of RLA and resistor R11 is a connection to a shunt lead L5 incorporating a diode D1 and connecting to a potentiometer network comprising resistors R12, R13 diodes D2 and D3, resistor R14 and lead L3. When the pulses are present in the output of TR3, TR4 holds the collector potential of TR5 so negative as to prevent diode D1 from conducting. The lead L5 is connected through a resistor R15 and a diode D4 to a resistor R16 connected with a lead L6 held at −35 volts. R13 is a thermistor and the negative feed-back through R15 and D4 prevents the collector potential of TR5 from changing too much with temperature. Both TR4 and TR5 normally work in Class A. If a fault occurs i.e. if TR4 open-circuits or short-circuits, the change in its electrode potential causes TR5 to cut off or bottom respectively. If TR5 bottoms or short-circuits, D1 conducts de-energising the relay RLA. If TR5 open-circuits or cuts off, its collector potential tends to rise to −35 volts, causing the normally non-conducting diodes D2 and D3 to conduct at −30 volts. The consequent negative voltage appearing at the junction of a resistor R17 and R14 is transmitted through a diode D5 to the base electrode of TR1 which is connected to lead L4 through a resistor R18. This negative voltage initiates the regenerative circuit causing TR2 to cut off.

With the circuit as so far described, suppose the relay RLA is de-energised normally by an absence of signal in TR1. As explained, TR1 is conducting and TR2 and TR3 are cut off. The path through the trigger circuit for the check pulses would be interrupted and they would not reach the output of TR3. D1 would then conduct and the large current flowing through R11 and D1 would prevent the relay RLA from energising again when the input again became positive. To avoid such circumstances arising, the fail-safe part of the trip circuit must not come into operation under normal conditions i.e. when the relay is energised or de-energised normally. This is taken care of by biasing the base of TR4 from the emitter of TR2 over a circuit comprising diode D6 and a resistor R19. Under normally tripped condition the emitter of TR2 is positive and this potential is fed over diode D6 to the base of TR4 to simulate the effect of a similar voltage which would occur normally from the integrating circuit of C5, R9. When the relay RLA is energised TR2 emitter becomes negative and D6 prevents this from being applied to TR4.

The voltage in lead L1 from the signal amplifier varies from 0 to +6 volts. For large positive voltages TR1 would be cut off so hard that the negative checking pulses would not pass therethrough. A diode D7 is connected between R1 and R2 and to a common terminal of resistors R20 and R21, the former being connected to the lead L4 and the latter resistor to the +10 volt lead L3. D7 prevents a large positive voltage being developed at the base of TR1. Lead L8 between a junction of R22 and R23 is taken through a diode D8 to an output stage of a signal amplifier preceding the trip circuit (e.g. 3 of FIGURE 1), so that should the output stage become defective, a large negative voltage appears in lead L8, overcoming the normal bias on TR4 and TR5 and causing D22 to conduct, thus de-energising the relay RLA.

The impedance values are given below:

| | |
|---|---|
| R1—5.6K ohms | R16—68K ohms |
| R2—2.2K ohms | R17—1K ohm |
| R3—1K ohm | R18—8.2K ohms |
| R4—25K ohms | R19—1K ohm |
| R5—1K ohm | R20—220K ohms |
| R6—470K ohms | R21—3.9K ohms |
| R7—470K ohms | R22—15K ohms |
| R8—1K ohm | R23—39K ohms |
| R9—1K ohm | R24—1K ohm |
| R10—8.2K ohms | R25—4.7 K ohms |
| R11—180K ohms | R26—680 ohms |
| R12—560K ohms | R27—2.2K ohms |
| R13—Thermistor | R28—1.2K ohms |
| R14—10K ohms | R29—150K ohms |
| R15—47K ohms | R30—1K ohm |
| | C4—.25 f. |
| C1—.25 f. | C5—4 f. |
| C2—.002 f. | |
| C3—.25 f. | |

I claim:

1. In a monitoring means for a fail-safe control circuit, a trigger circuit including a pair of regenerating coupled transistors, means for impressing the signal on said trigger circuit, means for impressing on the input of the first transistor of said trigger circuit a train of narrow electric pulses, a relay in an operating circuit connected to said trigger circuit, means in said trigger circuit for permitting said pulses to reach said relay operating circuit only when the trigger and relay circuits are functioning normally, means forming a short circuit path for said relay operating circuit, transistor means coupled to said relay circuit for maintaining said short circuit path ineffective in the presence of the narrow pulse train in the relay circuit and for rendering said short circuit effective to disable the relay when said transistor means is defective and in the absence of the narrow pulse train in said relay circuit.

2. In a monitoring means according to claim 1, an energising winding for said relay, means forming a shunt path for said winding, a diode in said path, and circuit means comprising a rectifying and integrating means for said pulses, a transistor coupled to said rectifying means and means in the circuit of said rectifying means, which in the absence of rectified pulses renders the diode conducting thereby deenergising the relay winding.

3. In a monitoring means according to claim 1, means in the input of the trigger circuit to limit the positive potential which may be fed to the trigger circuit by the signal derived from the apparatus under control.

4. In a monitoring means for a fail-safe control circuit, a trigger circuit, means for deriving a direct current signal from the apparatus under control and for impressing the signal on said trigger circuit, a direct current relay with an energising winding, relay control means in the operating circuit of said relay winding and in driven connection with said trigger circuit, means for impressing a train of narrow electric pulses on the input of said trigger circuit, means for causing said pulses to reach said relay operating circuit in the absence of circuit defect, and means connected with the circuit of said relay winding for de-energising the relay in the absence of said pulses in the relay circuit.

5. In a monitoring means for a fail-safe control circuit, a trigger circuit, means for deriving a direct current from the apparatus under control and for impressing the signal on said trigger circuit, a direct current relay with an energising winding, a transistor in the operating circuit of said relay winding and in driven connection with said trigger circuit, means for impressing a train of narrow electric pulses on the input of said trigger circuit, means for causing said pulses to reach said relay operating circuit in the absence of circuit defect, means for rectifying and integrating the narrow pulses in the output of the transistor in the relay winding circuit, a shunt path to the relay winding, a diode controlling the conduction in said path, shunt diode controlling transistors coupled to said rectifying and integrating means whereby the integrated pulses normally cause the output from the shunt controlling transistors to render the shunt path non-effective, and means connected between the shunt controlling transistors and the first transistor of the trigger circuit to suppress any positive signal appearing in the input of the first transistor of the trigger circuit in the event of defect in the shunt controlling transistors.

6. In a monitoring means according to claim 5, means which render the shunt path non-effective when the pulses are stopped due to normal trigger circuit operation.

References Cited in the file of this patent

UNITED STATES PATENTS

| | | |
|---|---|---|
| 2,782,405 | Weisz | Feb. 19, 1957 |
| 2,807,009 | Rowell | Sept. 17, 1957 |
| 3,015,042 | Pinckaers | Dec. 26, 1961 |